Patented Jan. 16, 1951

2,538,099

UNITED STATES PATENT OFFICE 2,538,099

STREPTOMYCIN ELUTION PROCESS

Roger A. Hoffman, Elkton, Va., and William A. Bittenbender, Plainfield, and Wilbur C. Stoll, Elizabeth, N. J., assignors to Merck & Co., Inc., Rahway, N. J., a corporation of New Jersey No Drawing. Application April 20, 1948, Serial No. 22,244

6 Claims. (Cl. 260—210)

This invention relates to the recovery of streptomycin from fermentation mediums and other aqueous solutions containing the same by procedures involving adsorption of the streptomycin on carbon, and particularly to an improved procedure for eluting adsorbed streptomycin from the carbon without the use of large volumes of volatile solvent. More particularly the invention relates to a procedure for removing adsorbed streptomycin from activated carbon by eluting with a dilute aqueous solution of cyclohexanol.

In the isolation of streptomycin from fermented broth obtained by the propagation of the organism S. griseus in aqueous nutrient mediums, as well as in the recovery of streptomycin from other aqueous solutions thereof, it has been the practice to treat such broth or aqueous solution with activated carbon to thereby adsorb the streptomycin and then, after washing the carbon and adsorbed streptomycin for removal of impurities, to elute streptomycin from the carbon by means of alcoholic acid, such as a methanol or ethanol hydrochloric acid solution. While this procedure for eluting streptomycin has been generally satisfactory it has the disadvantage, particularly in large-scale commercial use, of introducing a considerable hazard due to the large volume of volatile solvents which must necessarily be handled. In addition to the hazard introduced there are, of course, substantial losses due to the volatile nature of the solvent which make for inefficient operation.

We have now discovered that the disadvantages inherent in elution procedures for streptomycin previously employed can be fully overcome by employing as the elution solvent an aqueous solution of cyclohexanol having an acid pH. Cyclohexanol is a relatively high-boiling solvent as compared with methanol and ethanol, and furthermore the effective concentration of cyclohexanol is very small, ranging from about 0.1–2.8% (a saturated solution).

It has also been found that when aqueous cyclohexanol solution at an acid pH is employed for elution of streptomycin, there is a noticeable increase in the percent recovery of streptomycin and a more pronounced increase in the activity on a dry basis of the streptomycin so recovered.

In carrying out the process of the present invention streptomycin is removed from fermentation broth or other aqueous solution by treatment with activated carbon in the usual way, and the carbon with adsorbed streptomycin is then washed with water and with an aqueous solution containing 0.1–2.8% cyclohexanol. While this wash with cyclohexanol solution may be omitted, it is found that the preliminary wash with cyclohexanol provides somewhat better results than are obtained when the carbon and adsorbed streptomycin are washed with water alone.

After washing, the streptomycin is desorbed or eluted from the activated carbon by treating the same with an aqueous solution containing 0.1–2.8% cyclohexanol and having an acid pH. A pH of about 3.0 is found to be most satisfactory and adjustment of the acidity to this pH can be made by adding mineral acid such as hydrochloric acid, or a lower aliphatic carboxylic acid such as formic or acetic acid, to the cyclohexanol solution. Elution can be effected in various ways, for example, by stirring the carbon and adsorbed streptomycin in an acid aqueous solution of cyclohexanol, or by employing carbon columns for the adsorption of streptomycin and eluting the adsorbed streptomycin by passing the acid cyclohexanol solution through the column in accordance with the procedure more fully disclosed in an application of our colleague, F. J. Wolf, Serial No. 791,653, filed December 13, 1947.

The eluate is then neutralized to a pH of 6.5, preferably by an ion exchange resin and is then worked up to recover a crude solid product in the conventional manner by concentration to a small volume followed by precipitation in a solvent such as acetone.

Typical procedures for carrying out the process of the present invention are shown in the following examples, but it is to be understood that these examples are given by way of illustration and not of limitation.

Example 1

200 ml. of neutral streptomycin broth containing 170 units per ml. was treated with 20 gm. (1%) activated carbon by stirring for 10 minutes in a round bottomed flask. The resulting slurry was filtered and washed on the filter with about 10 ml. of water. The filtrate was discarded. The carbon containing adsorbed streptomycin was then slurried with 81 ml. of 0.5% cyclohexanol solution (by volume) in a 250 ml. beaker. This slurry was filtered and the filtrate was discarded.

The carbon filter cake was slurried with 81 ml. of 0.5% of cyclohexanol solution and acidified to pH 3.0 by the addition of 3.4 ml. of 2.5 N hydrochloric acid. The slurry was stirred for about 20 minutes and then filtered. The filter cake was washed with about 15 ml. of 0.5% cyclohexanol solution. This filtrate contained streptomycin activity. The elution at pH 3.0 was repeated using the same quantities as before. The two streptomycin-rich filtrates were combined, neutralized to pH 6.5 and worked up to a crude solid in the conventional manner by concentration to a small volume and precipitation in a methanol acetone mixture. A 90% yield of crude streptomycin containing 340 units/mgm. was obtained. A control experiment following the conventional procedure employing as an elution solvent a solution of 30% methanol by volume in water produced an 84% yield of crude streptomycin containing 299 units/mgm.

*Example 2*

200 ml. of neutral streptomycin broth containing 170 units/ml. was treated with 20 gm. (1%) activated carbon by stirring for 10 minutes in a round bottomed flask. The resulting slurry was filtered and washed on the filter with about 10 ml. of water. The filtrate was discarded. The carbon containing adsorbed streptomycin was then slurried with 81 ml. of 0.5% cyclohexanol solution (by volume) in a 250 ml. beaker. This slurry was filtered and the filtrate was discarded.

The carbon filter cake was slurried with 81 ml. of 1.0% of cyclohexanol solution and acidified to pH 3.0 by the addition of 3.4 ml. of 2.5 N hydrochloric acid. The slurry was stirred for about 20 minutes and then filtered. The filter cake was washed with about 15 ml. of 1.0% cyclohexanol solution. This filtrate contained streptomycin activity. The elution at pH 3.0 was repeated using the same quantities as before. The two streptomycin-rich filtrates were combined, neutralized to pH 6.5 and worked up to a crude solid in the conventional manner by concentration to a small volume (about 1 cc.) and precipitation in a methanol acetone mixture. An 85% yield of crude streptomycin containing 330 units/mgm. was obtained. A control experiment following the conventional procedure employing as an elution solvent a solution of 30% methanol by volume in water, produced an 84% yield of crude streptomycin containing 299 units/mgm.

Various changes and modifications in the procedure herein described will be apparent to those versed in the art. To the extent that such changes and modifications are within the purview of the appended claims, it is to be understood that they constitute a part of our invention.

We claim:

1. The process that comprises treating activated carbon having streptomycin adsorbed thereon with an aqueous solution containing 0.1–2.8% cyclohexanol and having a pH of about 3.0, and separating from the carbon the streptomycin-rich solution thus obtained.

2. The process that comprises treating activated carbon having streptomycin adsorbed thereon with an aqueous solution containing 0.5–1.0% cyclohexanol and having a pH of about 3.0, and separating from the carbon the streptomycin-rich solution thus obtained.

3. The process that comprises treating activated carbon having streptomycin adsorbed thereon with an aqueous solution containing 0.5–1.0% cyclohexanol and hydrochloric acid to provide a pH of about 3.0, and separating from the carbon the streptomycin-rich solution thus obtained.

4. The process for eluting streptomycin from activated carbon that comprises treating activated carbon having streptomycin adsorbed thereon with an aqueous solution containing 0.1–2.8% cyclohexanol and having a pH of about 3.0.

5. The process for eluting streptomycin from activated carbon that comprises treating activated carbon having streptomycin adsorbed thereon with an aqueous solution containing 0.5–1.0% cyclohexanol and having a pH of about 3.0.

6. The process for eluting streptomycin from activated carbon that comprises treating activated carbon having streptomycin adsorbed thereon with an aqueous solution containing 0.5–1.0% cyclohexanol and hydrochloric acid to provide a pH of about 3.0.

ROGER A. HOFFMAN.
WILLIAM A. BITTENBENDER.
WILBUR C. STOLL.

REFERENCES CITED

The following references are of record in the file of this patent:

UNITED STATES PATENTS

| Number | Name | Date |
|---|---|---|
| 2,449,866 | Waksman et al. | Sept. 21, 1948 |

OTHER REFERENCES

Carter et al.: Jour. Biol. Chem., vol. 160, pp. 337–342 (1945).

Science, vol. 102, pp. 34–35 (1945).